United States Patent [19]
Rispeter

[11] Patent Number: 5,562,306
[45] Date of Patent: Oct. 8, 1996

[54] ADJUSTABLE STEERING DEVICE

[75] Inventor: Siegfried Rispeter, Besigheim, Germany

[73] Assignee: Dr. Ing. h.c.F. Porsche AG, Weissach, Germany

[21] Appl. No.: 404,317

[22] Filed: Mar. 15, 1995

[30] Foreign Application Priority Data

Mar. 18, 1994 [DE] Germany ............... 44 09 250.4
Apr. 20, 1994 [DE] Germany ............... 44 13 789.2

[51] Int. Cl.⁶ ................................................. B62D 1/18
[52] U.S. Cl. ................................................. 280/775; 74/493
[58] Field of Search ............................ 280/775, 777; 74/493

[56] References Cited

U.S. PATENT DOCUMENTS

| | | | |
|---|---|---|---|
| 2,836,988 | 6/1958 | Cashman | 74/493 |
| 3,491,614 | 1/1970 | Saunders et al. | 74/493 |
| 3,807,252 | 4/1974 | Parr | 280/775 |
| 4,317,387 | 3/1982 | Myers et al. | 74/493 |
| 4,516,440 | 5/1985 | Nishikawa | 280/775 |
| 4,539,861 | 9/1985 | Nishikawa | 74/493 |
| 5,009,120 | 4/1991 | Iseler et al. | 280/775 |
| 5,027,674 | 7/1991 | Nolte et al. | 74/493 |
| 5,029,489 | 7/1991 | Burmeister et al. | 280/775 |
| 5,078,022 | 1/1992 | Ichikawa | 74/493 |
| 5,143,420 | 9/1992 | Higashino et al. | 280/775 |
| 5,148,717 | 9/1992 | Yamaguchi | 280/775 |
| 5,199,319 | 4/1993 | Fujiu | 280/775 |
| 5,368,330 | 11/1994 | Arnold et al. | 280/777 |

FOREIGN PATENT DOCUMENTS

| | | |
|---|---|---|
| 0231453A1 | 8/1987 | European Pat. Off. . |
| 0477509A3 | 4/1992 | European Pat. Off. . |
| 3318935C1 | 12/1984 | Germany . |
| 3808270A1 | 9/1989 | Germany . |
| 3914608C1 | 10/1990 | Germany . |
| 4205929A1 | 9/1992 | Germany . |

*Primary Examiner*—Eric D. Culbreth
*Assistant Examiner*—Paul N. Dickson
*Attorney, Agent, or Firm*—Evenson McKeown Edwards & Lenahan, PLLC

[57] ABSTRACT

An adjustable steering device for motor vehicles has a steering spindle which can be axially displaced in at least one jacket tube by way of an adjusting device, The adjusting device is provided with an operable adjusting element which holds the steering spindle and releases it for the displacement. The adjusting element includes at least one pressure segment which is held by at least one elastic tensioning element in a receiving ring embracing the protective steering tube, It has a toothing which can be brought into a fixing and a displacement position by a corresponding toothing on a protective steering tube by way of at least one tensioning device. As a result, an adjustable steering device is provided which ensures a simple and secure axial displacement and fixing while the behavior in a crash is good.

23 Claims, 10 Drawing Sheets

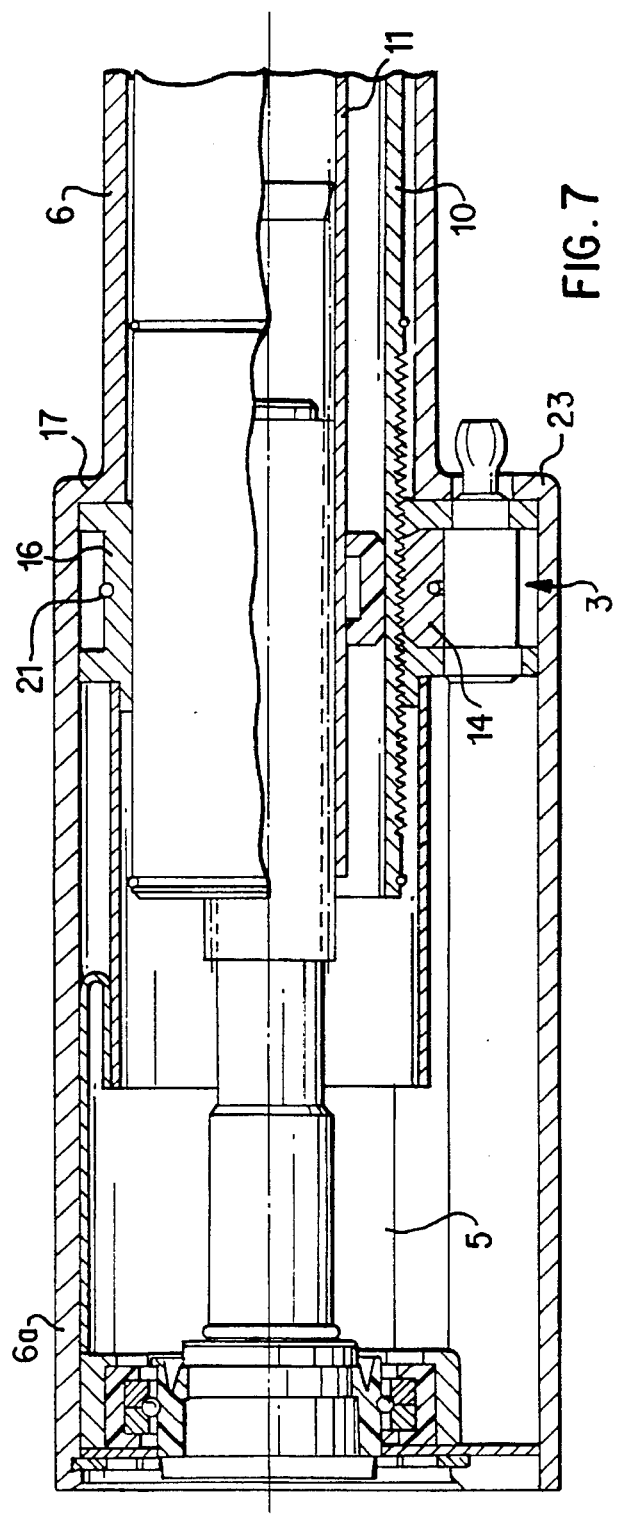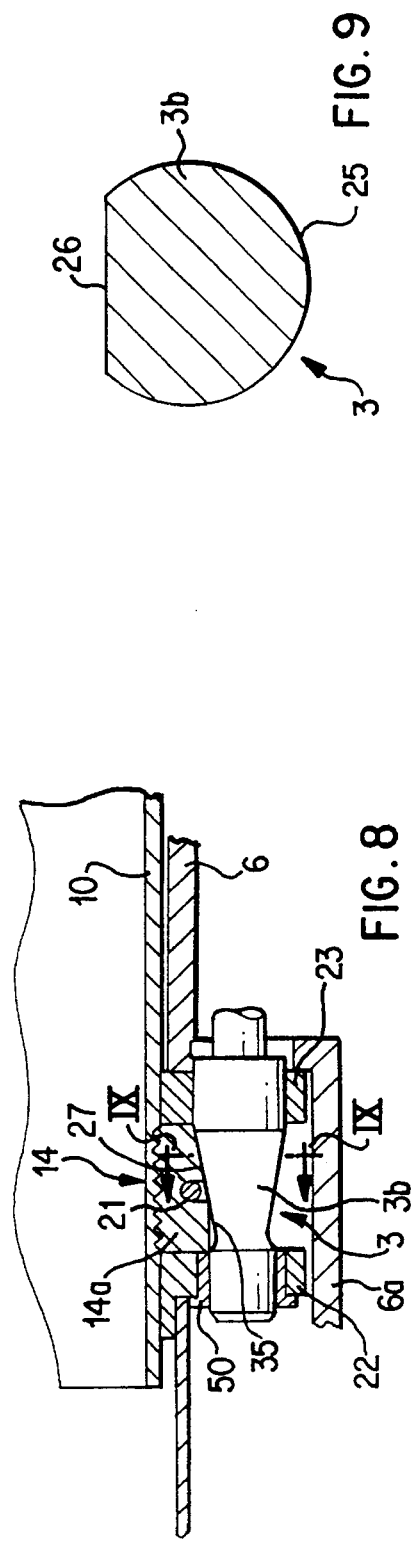

ADJUSTABLE STEERING DEVICE

BACKGROUND AND SUMMARY OF THE INVENTION

This invention relates to an adjustable steering device for motor vehicles comprising a steering spindle which is axially adjustably displaceably mounted in a jacket tube.

An axially adjustable steering device for motor vehicles is known from German Patent Document DE-33 18 935 C1. In the case of this device, a motor-driven pinion is constantly engaged with a protecting steering tube by way of a toothing. This protective steering tube is fixedly connected with the steering spindle and can be displaced by way of the pinion.

Furthermore, from U.S. Patent Document US-PS 28 36 988, an axially adjustable steering column is known in the case of which a spindle nut is caused to rotate by way of a motor-driven pinion. This spindle nut acts upon a protective steering tube which is connected with the steering spindle and is therefore axially displaced.

It is an object of the invention to provide an improved adjustable steering device which ensures a simple and secure axial adjustment and fixing while exhibiting good crash accommodating characteristics.

According to the invention, this object is achieved by providing an arrangement wherein the adjusting element includes at least one pressure segment which is held by means of an elastic tensioning element on a protecting steering tube which has a toothing, said pressure element having a toothing which is movable between a fixing and a displacement accommodating position by means of a tensioning device which controls the interengagement of the toothing on the protective steering tube and on the pressure element.

By means of the invention, it is mainly achieved that, in addition to an axial adjustment of the steering wheel carried by a steering spindle, an optimal energy absorption is achieved also in the case of a crash by way of an integrated deformation element.

The axial adjustment takes place essentially by way of a pressure segment of an adjusting element which, by means of a toothing, is engaged with a protective steering tube for fixing purposes and can be disengaged for the axial displacement.

In an advantageous further development of the invention, an energy absorption in the case of a crash is achieved by means of a deformation element in the form of a corrugated tube or of a reversed tube which is arranged between the pressure piece and a lower end of a jacket tube surrounding the protective steering tube.

In an advantageous further development, the pressure segment is held in a receiving ring and has a toothing which is correspondingly opposite a toothing of the protective steering tube. The operating of the adjusting element or of the pressure piece for taking up a fixed position and a displaced position takes place by way of a tensioning device consisting of a tensioning element. This is connected with an adjusting rod of a handle and can be adjusted by a rotating or a displacing so that the steering spindle can be brought into the displacement position or into the fixing position.

In certain preferred embodiments, tensioning element of the device acts directly in a flat manner on the pressure segment which can be rotated and/or displaced by way of the adjusting rod of the handle, and an adjustment or a fixing of the steering spindle can therefore be carried out in a simple manner. An axial displacement of the steering spindle and thus an adjustment of the steering wheel into different positions with respect to the driver takes place ill the loose position in which the toothings slide on one another corresponding to a ratchet effect. The pressure segment is held by way of the elastic tensioning element in the receiving ring in such a manner that, when the steering spindle or the protective steering tube is axially displaced, the pressure segment is pressed out of the toothing of the protective steering tube. The tooth-on-tooth position is avoided as a result of the elastic tensioning element.

In various further developments, the tensioning element may consist of an eccentric, a curved piece or a conical part. For connecting the adjusting rod with the handle, a hexagon fitting or the like is provided on the tensioning element.

The adjustment of the tensioning element may take place manually or by means of a motor, a corresponding switch being provided on the dashboard for the adjustment by means of a motor, by means of which switch the axial adjustment may be switched on and off.

For limiting the axial displacement, a longitudinal slot is provided in the protective steering tube into which a stop sleeve projects, and a starting position and end position can therefore be fixed. The jacket tube may have an impression whose shoulder strikes against the bearing of the pressure piece during the adjustment.

For absorbing energy in the case of a crash, a deformation element is connected with the adjustment element, which deformation element is supported on the receiving ring for the pressure segment. The opposite, facing-away end of the deformation element is held on a bearing ring which is fixed to the jacket tube by way of a snap ring. The deformation element can therefore be mounted in a simple manner in that the bearing ring is removed. During the mounting, the prestressed crash element is used as a spring element—tolerance compensation—and holds the mounted parts under prestress (noiselessness).

The actual receiving space for the adjusting device in the jacket tube in certain preferred embodiments has a larger diameter than the adjoining jacket tube, whereby advantageously a supporting wall is created for the receiving ring and therefore also for the deformation element. Furthermore, this receiving space is dimensioned such that optionally an adjusting device, which has a receiving ring and a pressure segment, may be accommodated as well. This adjusting device comprises a spindle nut which can be driven by a pinion and which moves by way of a toothing on the jacket tube, in which case the pinion can be driven by a motor or manually.

In certain preferred embodiments, bearings of the jacket tube on the vehicle body are selected such that the lower bearing is provided approximately in the center of the deformation element and between two bearings adjacent to the lower bearing of the adjusting element.

According to certain preferred embodiments with a simplified and lower-cost device, the outer jacket tube surrounding the protective steering tube is provided with a recess in which the pressure piece is held in a radially displaceable manner between outwardly projecting walls. The tensioning device is also disposed in these walls so that a constructionally simple solution is obtained for the axial adjustment of the steering column. A deformation element is not provided in the case of this device.

Other objects, advantages and novel features of the present invention will become apparent from the following

BRIEF DESCRIPTION OF THE DRAWINGS

FIG. 7 is a sectional view of a jacket tube of a steering column with a deformation element constructed as a reversed tube, and with an adjusting device constructed according to another preferred embodiment of the invention;

FIG. 8 is a partial, sectional schematic view of a construction with the pressure segment as a curved segment with tolerance compensation;

FIG. 9 is an enlarged sectional view according to Line IX—IX of FIG. 8;

DETAILED DESCRIPTION OF THE DRAWINGS

Figure 1:
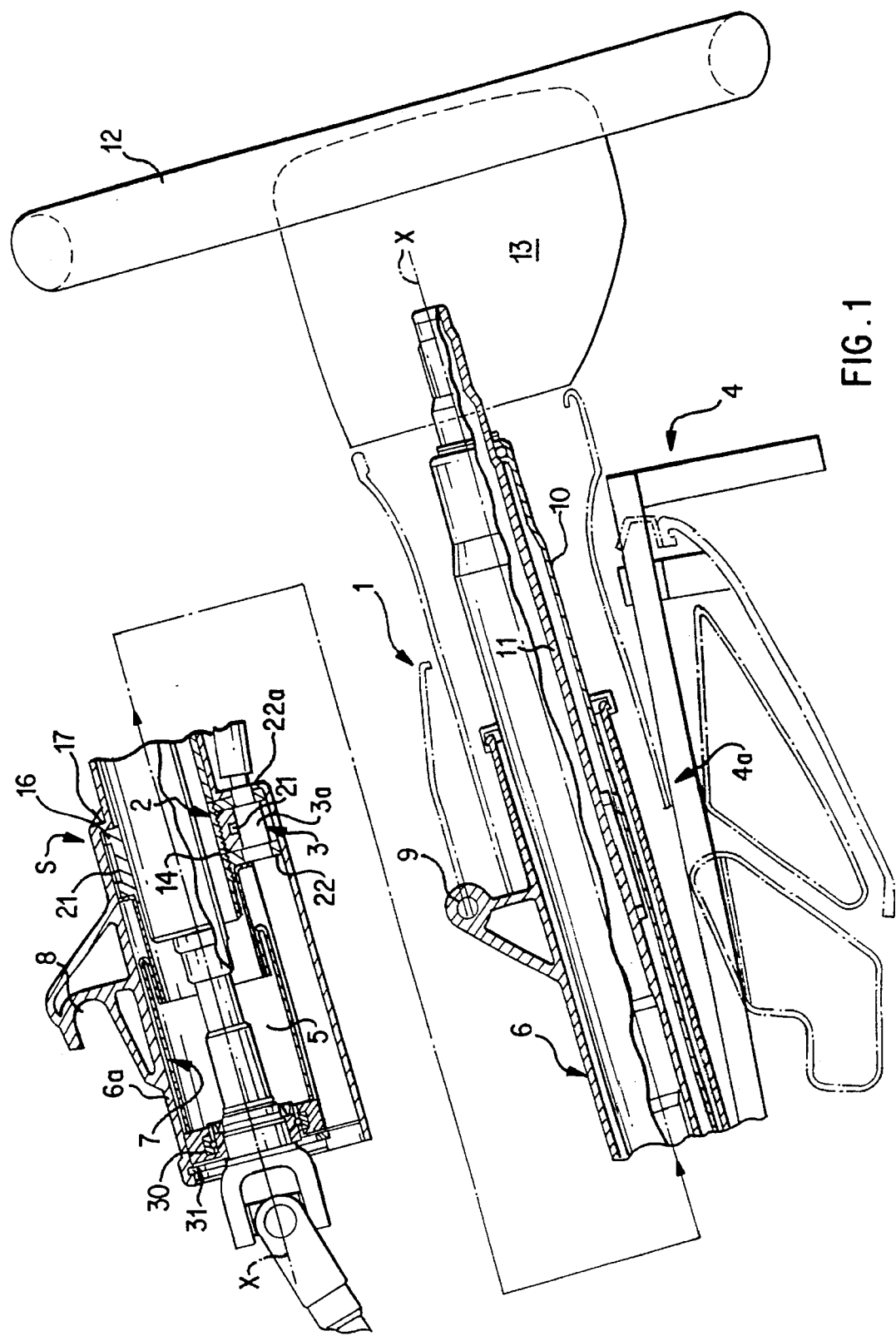
FIG. 1 is a partial sectional view of a steering column with an axial adjusting device, constructed according to a preferred embodiment of the invention.

Throughout the following description of the preferred embodiments, and in the drawings, like reference characters are used to indicate similar functioning parts. Unless otherwise described, the description of parts for one drawing figure applies to parts having the same reference characters in the other drawing figures.

Figure 2:
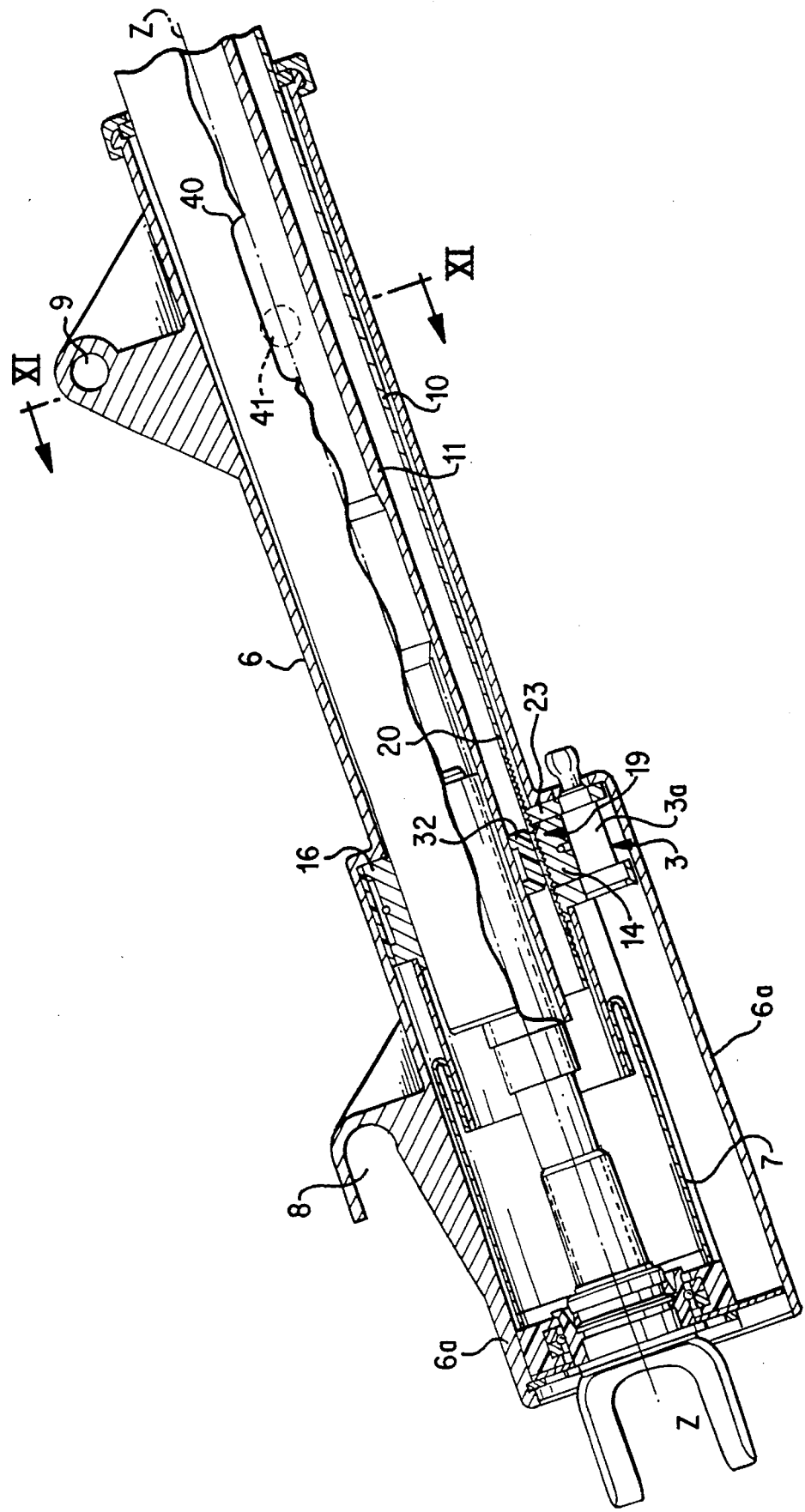
FIG. 2 is an enlarged representation of the adjusting device according to FIG. 1.

Referring to FIGS. 1 and 2, an adjustable and energy-absorbing steering device is arranged in a steering column 1 and comprises essentially an adjusting element 2, a pressure exercising tensioning element 3 and an adjusting rod 4a of a handle 4 which is connected with this tensioning device 3. This adjusting device S is arranged in a receiving space 5 of a jacket tube 6, 6a together with a deformation element 7. The whole jacket tube 6 is fastened by way of at least two bearings 8, 9 on the vehicle body and receives an interior protective steering tube 10 as well as a steering spindle 11 held in it which carries a steering wheel 12 on the end side. In addition to the deformation element 7, an air bag may be arranged in the steering wheel head 13 for collision protection of a driver. In the longitudinal direction, the steering spindle 11 is connected by way of bearings rotatably in a fixed manner with the protective steering tube 10.

The adjusting element 2 comprises a pressure segment which is held in a recess 15 of a receiving ring 16. This ring 16 is arranged on the protective steering tube 10 and is supported on a radial annular wall 17 of the jacket tube portion 6a whose diameter is expanded. This area of the jacket tube 6 is constructed with a partial expansion 18 for receiving the tensioning device 3.

The pressure segment 14 has a toothing 19 which is directed to a toothing 20 of the protective steering tube 10. The toothings 19, 20 are preferably aligned transversely to the longitudinal axis Z-Z of the steering column 1. The pressure segment 14 is held on the receiving ring 16 by way of a resilient tensioning element 21, such as a rubber elastic O-ring.

The tensioning device 3 is in an operative connection with the pressure segment 14. This tensioning device 3 is rotatably or slidably held in bearing lugs 22, 22a of the receiving ring 16.

Figure 10:
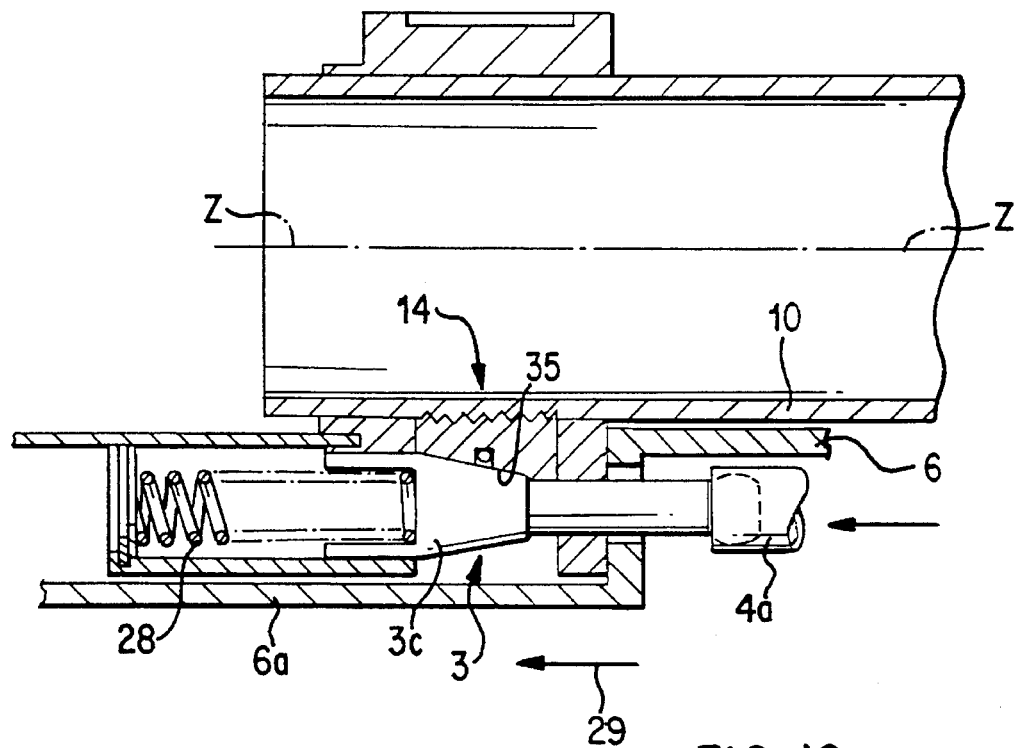
FIG. 10 is a view of another embodiment showing the pressure segment as a conical piece.
Figure 11:
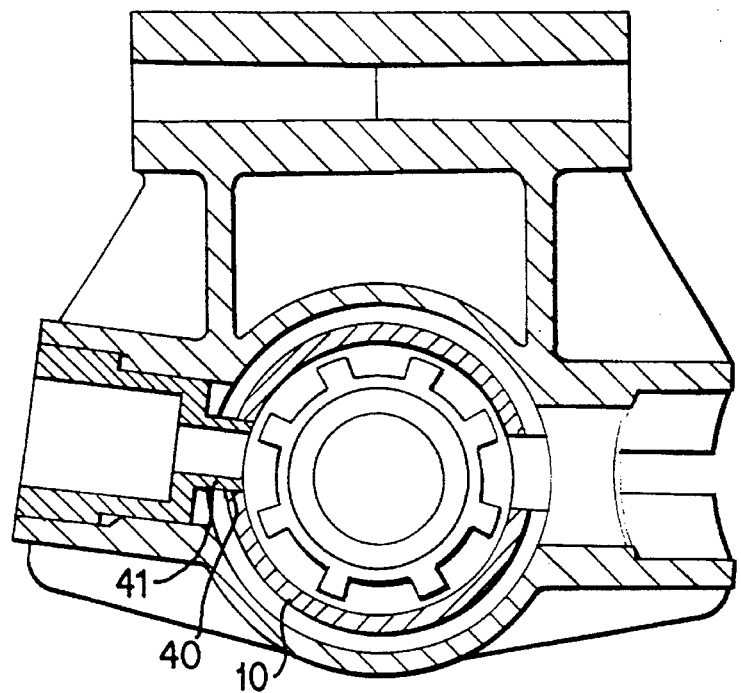
FIG. 11 is a sectional view of the steering column in area of a bearing slot and of a stop sleeve, constructed according to preferred embodiments of the invention.

The tensioning device 3 may consist of an eccentric part 3a (FIG. 1 and 2), a curved segment 3b (FIG. 8) or a conical part 3c (FIG. 10). The tensioning device 3 may also have an oval cross-section.

By means of the construction of the tensioning device 3 as a curved segment 3b as shown in FIG. 8, a tolerance compensation is achieved of all play in the axial and radial direction by way of a threaded bush 50 and the dynamic stiffness is increased at the same time. As a result of the slope of the curved cone during a revolution corresponding to the thread pitch of 1 mm a portion of the tolerance can be absorbed and the remainder can be absorbed by way of the shape of the curve according to FIG. 9. When the adjusting device 3 is constructed as a conical piece 3c as shown in FIG. 10, an automatic tolerance compensation takes place by the contact pressure caused by a spring 28. In the case of this conical piece, the tolerance compensation is continuous.

The axial adjusting of the steering column or of the steering spindle 11 with the steering wheel 12 takes place by the rotating of the handle 4 which can be connected by way of a hexagon nut-socket type connection or the like with an adjusting lever 4a.

In the displacement accommodating position, the toothings 19, 20 of the pressure segment 14 and of the protective steering tube 10 are only loosely engaged with one another by way of the tensioning element 21 so that the protective steering tube 10 can be axially displaced with respect to the pressure segment 14. In this case, the toothings 19, 20 slide on one another and a so-called ratchet effect is achieved.

In the fixing position, the tensioning element 3 is rotated and the toothings 19, 20 of the pressure segment 14 and of the protective steering tube 10 are engaged with one another.

For this purpose, the tensioning device 3 is constructed in the manner of an eccentric part 3a, a curved segment 3b or as a conical part 3c so that in the case of a rotation at a small angle either a tension on the pressure segment 14 for achieving the fixing position or, during a continuous rotating or rotating back, the tension on the pressure segment 14 is reduced and the displacement position is taken up.

As illustrated in FIGS. 8 and 9 in detail by means of the curved segment 3b, a circular arc path 25 changes into a flattened plane surface 26 which is opposite the pressure segment 14 in the displacement accommodating position, in which case the circular arc path 25 of the pressure segment 14 is acted upon with a tension when in the fixing position. In the case of this embodiment according to FIG. 8, the pressure segment has a diagonal surface 27 which will then be opposite the surface sections 25 and 26.

According to the embodiment of FIG. 10, the tensioning device 3 consists of a conical piece 3c which, under the tension of the spring 28, is pressed into the fixing position. For achieving a displacement accommodation position, the conical piece 3c is pressed against the spring 28 in the direction of the arrow 29 so that the pressure segment 14 is released from the toothing 20 on the steering tube 10. This pressure segment 14 also has a diagonal surface 35. The pressure segment 14 may also have such a construction that, for the displacement accommodating position, it is pulled against the tension of the spring 28 instead of being pressed.

The operating or the swivelling of the tensioning device 3 takes place either manually by way of the adjusting rod 4a of the handle 4 or by a motor, in which case the tensioning device 3 will then be connected with a controllable motor. The operating of the motor takes place by way of a switch arranged on the dashboard by means of which the adjusting movement can be initiated.

Figure 16:
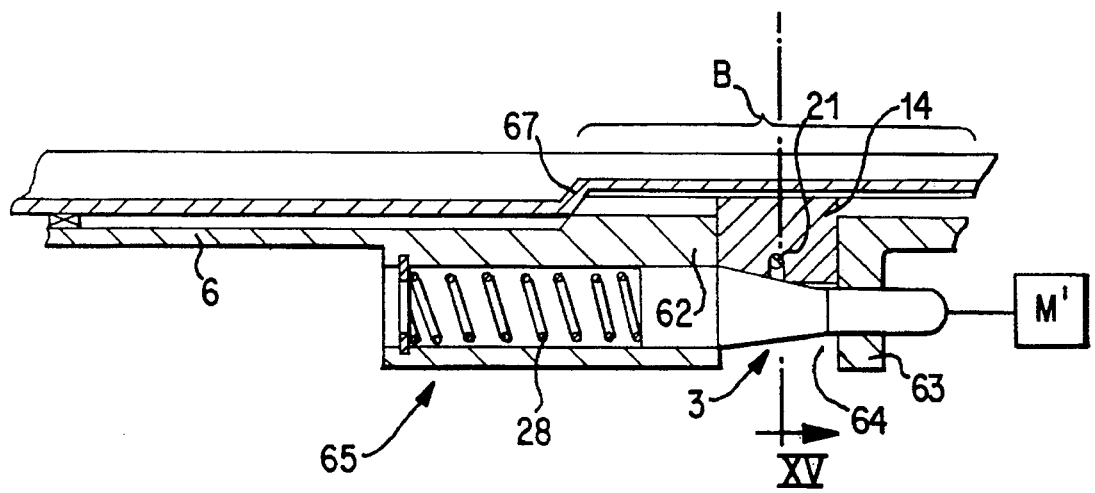
FIG. 16 is a partial schematic view showing another preferred embodiment with a motor driven adjusting device.

FIG. 16 schematically depicts an arrangement with a tensioning device connected with a controllable motor M' for driving the conical member.

The pressure segment 14 and the tensioning device 3 are arranged in a perpendicular center plane X-X of the steering column 1. The plane X-X extends adjacent to the lower bearing 8 of the jacket tube 6 and between the two bearings 8 and 9. Bearing 8 is provided approximately in the center of the deformation element 7 and in the center between the adjusting device and a lower bearing ring 30. This bearing ring 30 is fixed in the jacket tube 6, 16a by way of a snap ring 31 or the like. At the same time, the bearing ring 30 forms a receiving device for the steering spindle 11 in the jacket tube 6. Additional radial bearing elements 32 for the steering spindle 11 are provided between the receiving ring 16 and the jacket tube 6.

Figure 3:
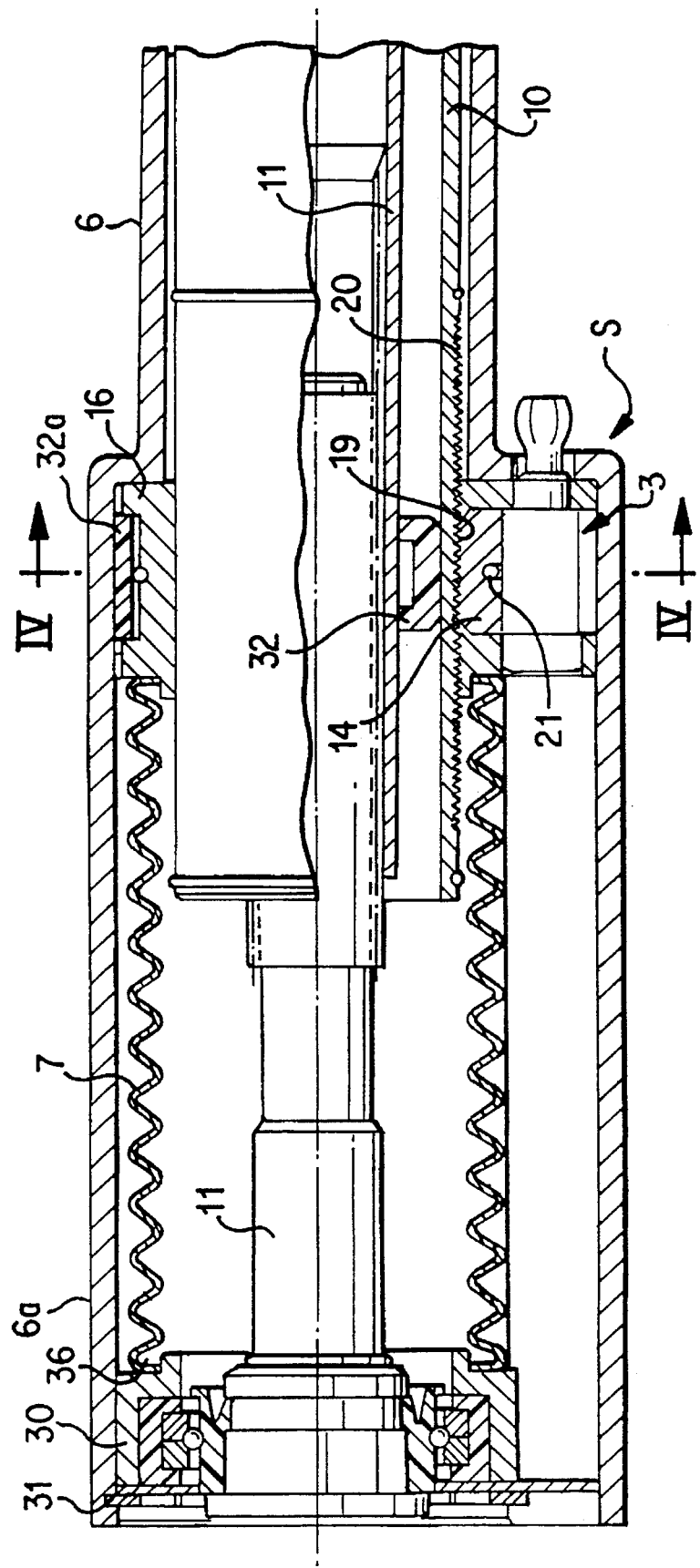
FIG. 3 is an enlarged sectional view of a jacket tube of a steering column comprising a deformation element constructed as a corrugated tube and an adjusting device, with an eccentric part as the pressure segment, constructed according to another preferred embodiment of the invention.
Figure 6:
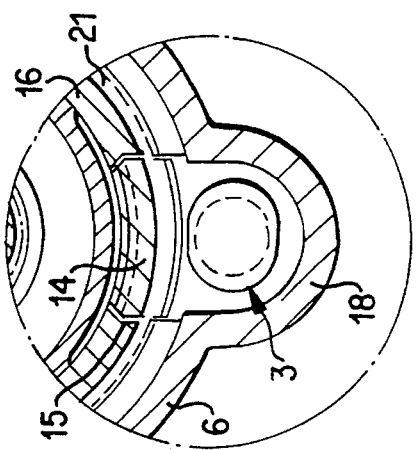
FIG. 6 is an enlarged detail X similar to FIG. 5 but showing parts in a steering wheel displacement accommodating position.
Figure 5:
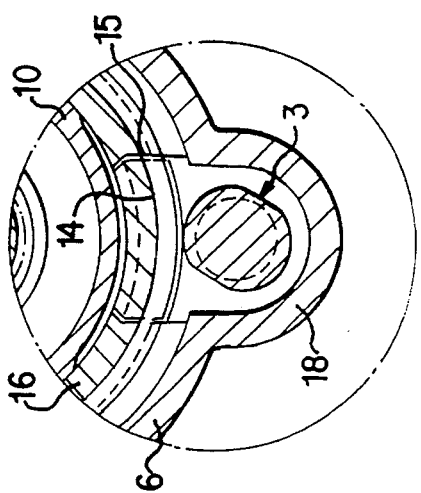
FIG. 5 is an enlarged detail X according to FIG. 4, showing parts in a fixing position of the steering wheel.
Figure 4:
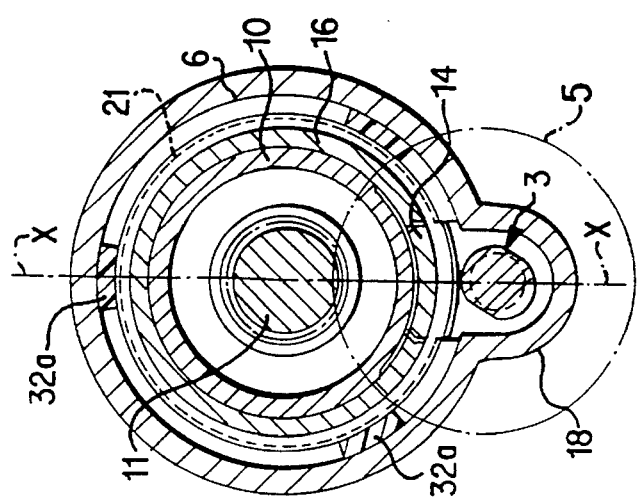
FIG. 4 is a sectional view taken along Line IV—IV of FIG. 3.
Figure 12:
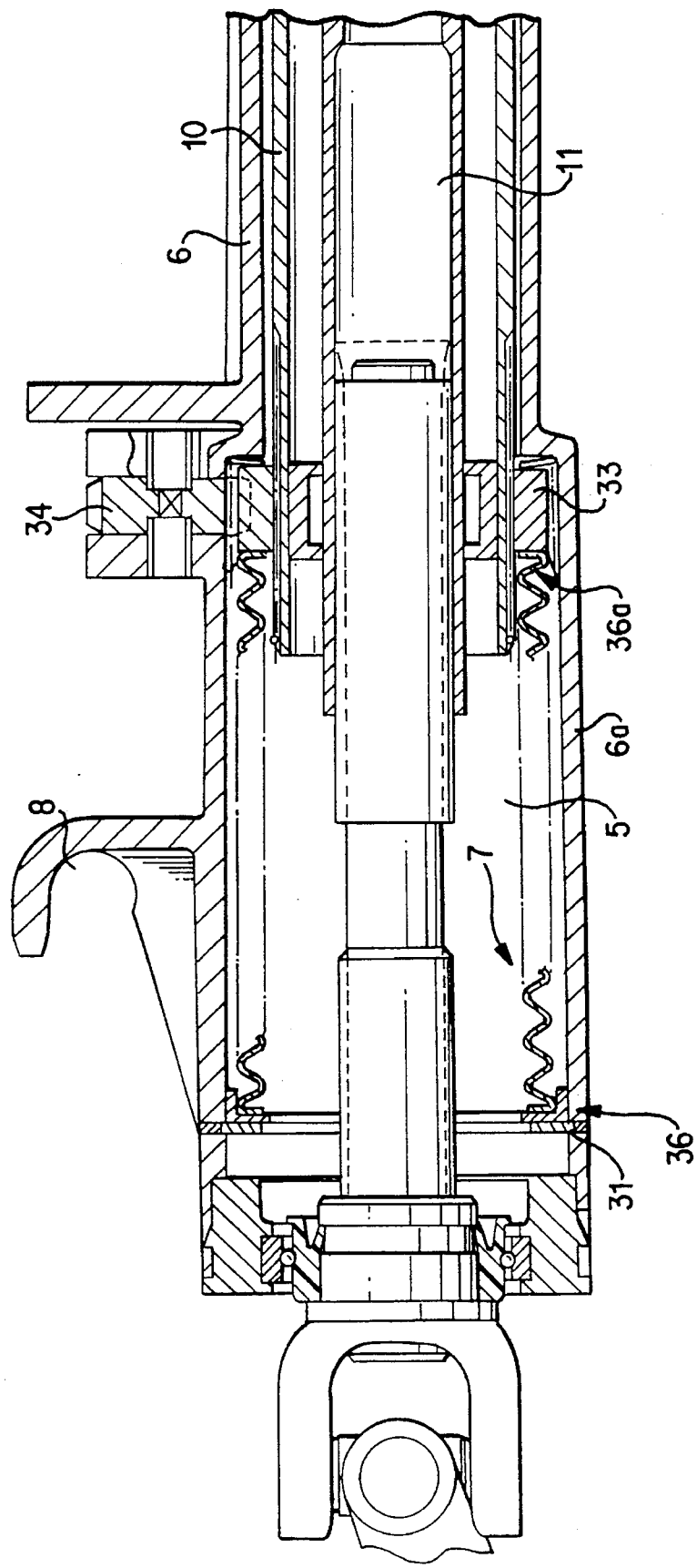
FIG. 12 is a sectional view of an adjusting device in the receiving space of a jacket tube, which adjusting device consists of a spindle nut on the pinion, constructed according to another preferred embodiment of the invention.

The receiving space 5 of the jacket tube section 6a which receives the adjusting device S is dimensioned in such a manner that also an adjusting device can be received which consists of a spindle nut 33 with a pinion 34 (FIG. 12). The pinion 34 is adjusted either manually or by way of a motor. The spindle nut 33 is in an operating connection with the protective steering tube 10 by way of a thread. The deformation element 7 is supported on the spindle nut 33 by means of an end 36a. The end 36 of the deformation element which faces away is held, for example, on a bearing ring 30 (FIG. 3) or a snap ring 31 (FIG. 12). A corrugated tube or a reverse tube may be used as a deformation element 7.

Figure 13:
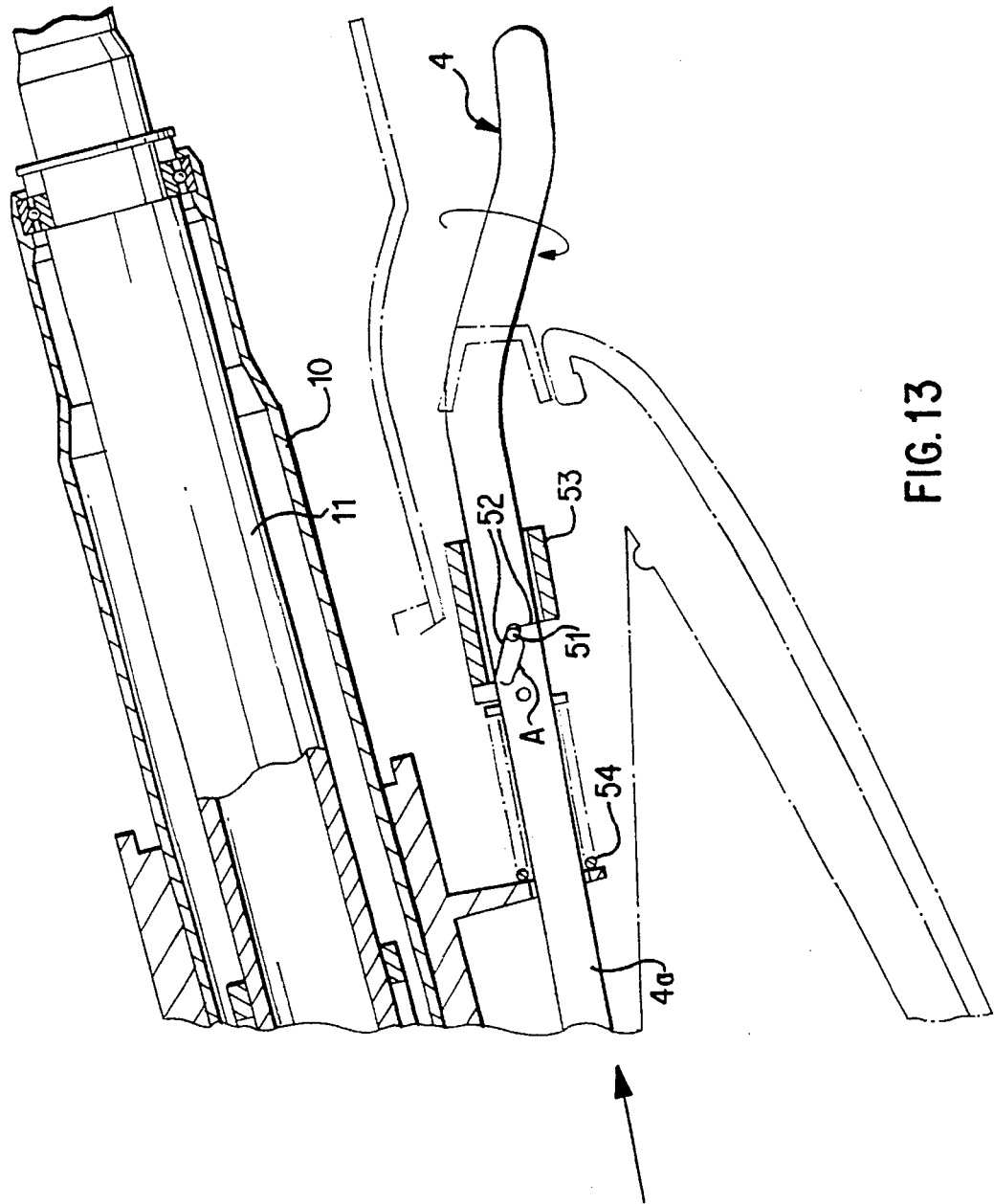
FIG. 13 is a lateral view of the adjusting rod showing a handle with forced guidance, constructed according to a preferred embodiment of the present invention.

Referring to FIG. 13, adjusting rod 4a of handle 4 can be swivelled by way of a pin 51 on a guideway 52 of a holding element 53 into fixing and displacement positions of the steering spindle. The guideway 52 is constructed in a sloping manner for taking-up the displacement position. The adjusting rod is held pressed against the guideway under the tension of a spring 54.

Figure 14:
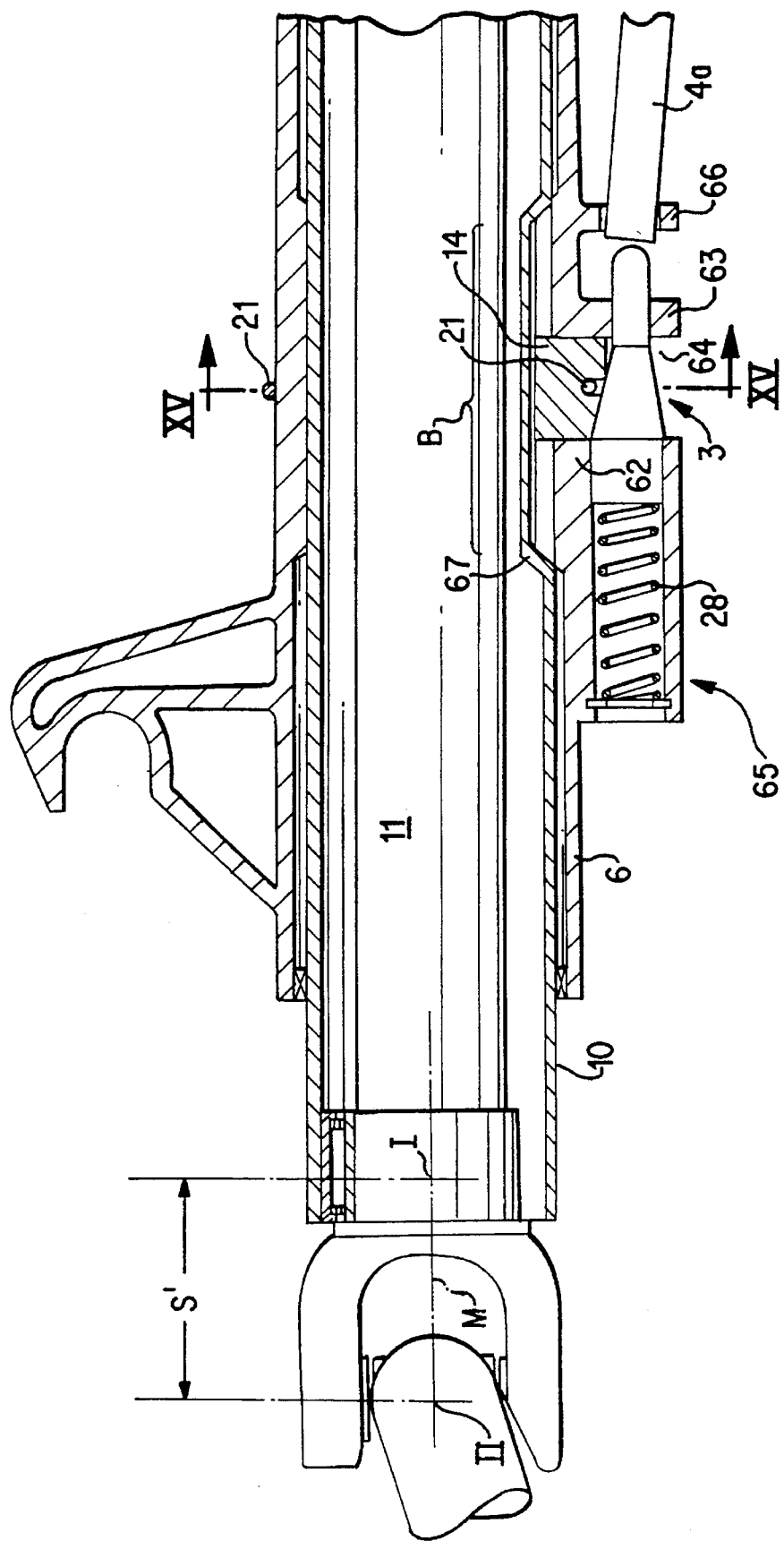
FIG. 14 is a sectional view of another construction of a steering column with an adjusting device in the jacket tube.
Figure 15:
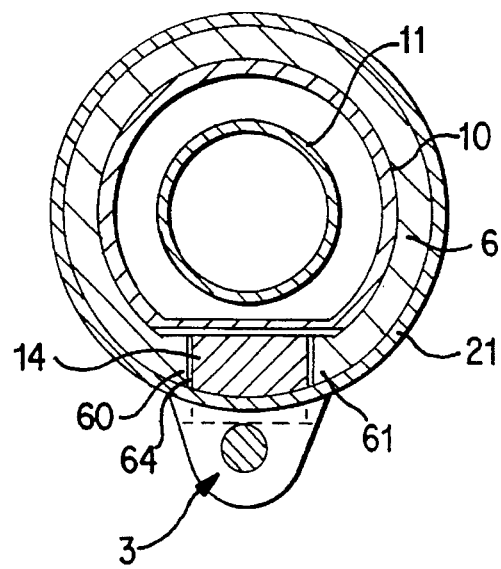
FIG. 15 is a sectional view taken along Line XV—XV of FIG. 14.

According to another embodiment of the device according to FIG. 14 and 15, the adjusting device is arranged in the outer jacket tube 6. This jacket tube 6 has a recess 64 in which the pressure segment 14 is held in a radially displaceable manner between projecting walls 60 to 63.

The pressure segment 14 engages with the toothing 20 of the protective steering tube 10 which is arranged in an indented area B of the tube 10. At this same time, this indentation 67 bounds the adjusting path S of the steering spindle.

FIG. 14 illustrates this axial position S', in which case the center position is defined as M, and the maximally moved-out position is illustrated at II and the moved-in position is illustrated as I. In the illustrated position according to FIG. 14, the pressure segment 14 is in the center position M The adjusting device 3D is disposed in an axially displaceable manner in the walls 62 and 63 which extend in an opposite fashion and transversely to the jacket tube 6. The wall 62 is adjoined by a cylindrical receiving device 65 for the spring element 28, which engages with the adjusting device 3D. By means of its end 67, the adjusting rod 4a is disposed in a bent-away web 66.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Adjustable steering device for motor vehicles, comprising a steering spindle which can be axially displaced in at least one jacket tube by means of an adjusting device, the adjusting device comprising an operable adjusting element which selectively holds and releases the steering spindle for axial displacement, wherein the adjusting element includes at least one pressure segment which is held by means of an elastic tensioning element on a protective steering tube which has a toothing, said pressure segment having a toothing which is movable between a fixing and a displacement accommodating position by means of a tensioning device which controls the interengagement of the toothing on the protective steering tube and on the pressure segment, and wherein the tensioning device includes a conical piece and engages with a pressure spring in such a manner that the pressure segment is arranged to be held in the fixing position and takes up the displacement position against the pressure spring.

2. Adjustable steering device for motor vehicles, comprising a steering spindle which can be axially displaced in at least one jacket tube by means of an adjusting device, the adjusting device comprising an operable adjusting element which selectively holds and releases the steering spindle for axial displacement, wherein the adjusting element includes at least one pressure segment which is held by means of an elastic tensioning element on a protective steering tube which has a toothing, said pressure segment having a toothing which is movable between a fixing and a displacement accommodating position by means of a tensioning device which controls the interengagement of the toothing on the protective steering tube and on the pressure segment, and comprising an energy absorbing deformation element interposed between the steering spindle and vehicle body support parts, wherein the jacket tube is held on a vehicle body by way of at least two bearings, one bearing being provided on an expanded area of the jacket tube which receives the adjusting device, wherein the adjusting device is arranged directly adjacent to said one bearing.

3. Adjustable steering device according to claim 2, wherein the lower bearing is arranged near the deformation element between a receiving ring of the adjusting device and a bearing ring.

4. Adjustable steering device according to claim 3, wherein the deformation element is arranged under prestress between the bearing ring and the receiving ring.

5. A steering assembly for motor vehicle comprising:

a steering spindle which is axially adjustably movable, a first set of locking teeth carried by said spindle, a pressure segment mounted for radial movement and having a second set of locking teeth, and a conical part abuttingly engageable with said pressure segment and axially movable between a locking position radially pressing the pressure segment and said second set of locking teeth into locking engagement with the said first set of locking teeth to lock said steering spindle in an axially adjusted position and an unlocking position permitting radial movement of said pressure segment and said second set of locking teeth out of locking engagement with said first set of locking teeth to permit axial adjustment of the steering spindle, and an elastic tensioning element which continuously biases the pressure segment towards the locking position with a small force while permitting axial adjusting movements of the spindle, wherein said elastic tensioning element is disposed in a groove in said pressure segment.

6. A steering assembly according to claim 5, comprising a protective tube surrounding said spindle and a jacket tube surrounding the protective tube, said jacket tube being fixed in position when in an in-use position in a vehicle, said protective tube being axially movable together with said spindle, said first set of teeth being on said protective tube.

7. A steering assembly according to claim 6, wherein said pressure segment is mounted for radial movement at a radial recess section of the jacket tube.

8. A steering assembly according to claim 7, comprising a spring continuously biasing the conical part toward said locking position.

9. A steering assembly according to claim 8, wherein said spring comprises elastic means continuously biasing the conical part towards said locking position.

10. A steering assembly according to claim 9, wherein said elastic means is disposed in a space defined by walls of the jacket tube.

11. A steering assembly according to claim 6, comprising an energy absorbing deformation element disposed at one axial end face of said jacket tube.

12. A steering assembly according to claim 11, wherein said deformation element is spaced axially from said pressure segment.

13. A steering assembly according to claim 11, wherein said deformation element is clamped between a spindle bearing support part and a section of the jacket tube which forms a radial recess for providing radial movement of the pressure segment.

14. A steering assembly according to claim 5, comprising a spring continuously biasing the conical part toward said locking position.

15. A steering assembly according to claim 14, comprising a manually operable member connected with the conical part for accommodating manual movement of said conical part from said locking position to said unlocking position against a force applied by a biasing spring.

16. A steering assembly according to claim 5, wherein said conical part is selectively manually movable from said locking position to said unlocking position against a force applied by a biasing spring.

17. A steering assembly according to claim 5, comprising elastic means continuously biasing the conical part towards said locking position.

18. A steering assembly according to claim 5, comprising a manually operable handle serving to control the position of the pressure segment, wherein an adjusting rod of the handle is disposed in a bent-away web at one end.

19. A steering assembly according to claim 5, wherein the pressure segment and the elastic tensioning element are arranged in a common perpendicular center plane of the steering spindle.

20. A steering assembly according to claim 5, wherein the conical part is connected with a handle which can be rotated into a fixing and a displacement position of the pressure element.

21. A steering assembly according to claim 20, wherein the conical part is connected with an auxiliary displaceable adjusting rod of the handle in such a manner that the conical part is displaced in parallel to a longitudinal axis of the steering spindle.

22. A steering assembly according to claim 5, comprising an adjusting rod driven and controlled by a motor for controlling the position of the conical part.

23. A steering assembly according to claim 11, wherein said energy absorbing deformation element is disposed between a bearing support for the spindle and said end face of the jacket tube.

* * * * *